United States Patent [19]

Rust

[11] 4,195,620
[45] Apr. 1, 1980

[54] LARGE AREA PARABOLIC CONCENTRATING SOLAR COLLECTOR

[76] Inventor: Rudolph Rust, 8192 Deerfield Dr., Huntington Beach, Calif. 92646

[21] Appl. No.: 882,047

[22] Filed: Feb. 28, 1978

[51] Int. Cl.² ............................................... F24J 3/02
[52] U.S. Cl. ..................................... 126/425; 126/439
[58] Field of Search .................... 126/270, 271; 264/1; 350/293, 295, 310, 178

[56] References Cited

U.S. PATENT DOCUMENTS

| | | | |
|---|---|---|---|
| 4,010,614 | 3/1977 | Arthur | 126/270 |
| 4,040,411 | 8/1977 | Rust | 126/271 |
| 4,086,485 | 4/1978 | Kaplow et al. | 126/271 |
| 4,130,109 | 12/1978 | Bru eck | 126/271 |

*Primary Examiner*—Larry I. Schwartz

[57] ABSTRACT

An apparatus for the concentration of solar radiation by directing it upon Fresnel zone sections of axially short, electroplated surfaces of spin cast parabolic mirrors. The short focal length optical system is composed of off axis parabolic surfaces of revolution and secondary reflectors. These reflectors concentrate the suns rays to produce heat with which to generate steam, and to melt high temperature salts.

8 Claims, 4 Drawing Figures

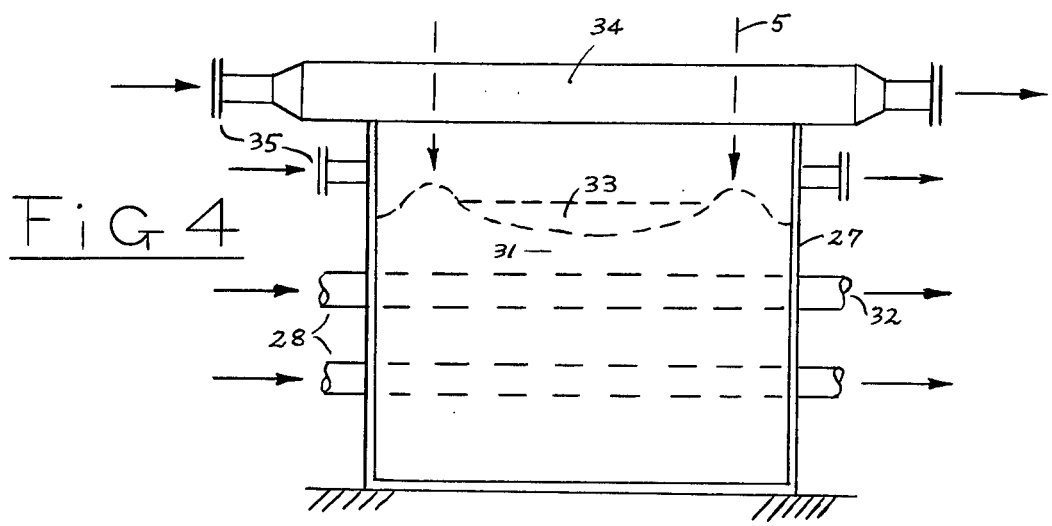

LARGE AREA PARABOLIC CONCENTRATING SOLAR COLLECTOR

REFERENCE TO A RELATED PATENT

A similar application, Ser. No. 612106, group 344, was filed Sept. 10, 1975 for an "Apparatus for Concentration of Solar Radiation". It issued Aug. 9, 1977 as U.S. Pat. No. 4,040,411. To meet the requirement of rule 205 (b) of 37 CFR 1.205 (b) of the Rules of Practice, applicant here acknowledges that the first claim listed in this instant application is only similar to (but not copied from) his previous U.S. Pat. No. 4,040,411. The differences are that this application has a parabolic surface that is (1) off axis, (2) a solid surface, (3) Fresnel zone sections, and (4) Axially shortened optics.

| UNITED STATES PATENTS CITED | | | |
|---|---|---|---|
| 282,879 | Aug. 7, 1883 | D. Garrett | Cl unknown |
| 1,570,819 | Jan 26, 1926 | Blasius Bart | Cl unknown |
| 1,574,544 | Feb 23, 1926 | Blasius Bart | Cl unknown |
| 1,583,268 | May 4, 1926 | Blasius Bart | Cl unknown |
| 1,587,268 | Jun 1, 1926 | Blasius Bart | Cl unknown |
| 1,593,998 | Jul 27, 1926 | Blasius Bart | Cl unknown |
| 1,603,374 | Oct 19, 1926 | Blasius Bart | Cl unknown |
| 1,678,711 | Jul 31, 1928 | L.H. Shipman | Cl unknown |
| 2,972,782 | Feb 28, 1961 | P.B. Archibald | Cl 18/58.3 |
| 3,274,301 | Sep 20, 1966 | J.F. Kulp Jr | Cl 264/1 |
| 3,892,433 | Jul 1, 1975 | F.A. Blake | Cl 290/52 |
| 3,905,352 | Sep 16, 1975 | Arnold Jahn | Cl 126/270 |
| 4,040,411 | Aug 9, 1977 | Rudolph Rust | Cl 126/271 |

LIST OF FIGURES

FIG. 1 Side view showing the elevation of the solar collector.

FIG. 2 Axial view from the sun of the solar collector.

FIG. 3 Side view of a typical telescoping heliostat on the parabolic concentrating solar collector.

FIG. 4 Side view of the solar kiln used on the parabolic solar collector.

BACKGROUND OF THE INVENTION

Solar energy has been available since the U.S. Pat. No. 1,678,711 was granted to L. H. Shipman, dated July 31, 1928. This patent used a solar heat drier for concentrating light from the sun with a lens to dry peat at low enthalpy levels. The U.S. Pat. No. 2,972,782 dated Feb. 28, 1961 by Paul B. Archibald cited a spin casting method for fabricating plastic backing for parabolic mirrors. However, the patent used heat lamps which made non uniform curing temperatures over large area plastic mirrors, and thus it is not practical.

The U.S. Pat. No. 3,274,301 dated Sept. 20, 1966 by John F. Kulp Jr, also used epoxy resin while curing the slurry at room temperature during turn table spin casting periods as long as 36 hours of rotation. A general problem with most epoxy type resin materials is the long 36 hour curing time required for continuous rotation. Such long curing times perturb the constant angular velocity required of the turn table while rotating the casting. The turn table drive motor experiences variations in line voltage during daytime and night operation that can not be compensated for by using expensive line voltage stabilization equipment. The surface resulting from such an "as cast" parabola is different than the desired parabolic curve and the disturbance remains solidified on the final product due to the "wow" resulting from non uniform rotation on a centrifuge.

It is well known to the art that parallel rays of radiant energy from the sun directed axially toward the reflecting surface of a paraboloid of revolution come to a focal point, or what is called an effective focal area. It is also known to the art that rotating a "free surface" of liquid in the Earth's gravity field such as mercury, melted parafin, or potters plaster forms parabolas. Spin casting can be done on a centrifuge with all known molten metals, also epoxy, concrete, or other viscous slurried substances that harden quickly while being rotated will form rigid surfaces that are paraboloids of revolution.

The first small electroplated parabolic mirrors were from U.S. Pat. No. 282,879 dated Aug. 7, 1883, by D. Garrett for manufacturing headlight reflectors. Other silvered parabolic reflectors were fabricated in 1926 by the Bart manufacturing co, of New Jersey. A spraying method was invented for the U.S. Pat. Nos. 1,574,544 along with 1,583,268, 1,587,268 and also 1,603,374 to apply the silver. Then copper metal was used as a reinforcement on the back of the silver plated master by electroforming as described in the U.S. Pat. Nos. 1,570,819 and 1,593,998. Many replica parabolas may thus be duplicated from a single master for a particular radial position of a very large sectionalized parabola as contemplated in the instant application.

Large size solid surface parabolic mirrors have not been developed because of the tremendous expense of making a continuous parabolic arc extending over great areas. The instant application uses large honeycomb sections of mirror which are discontinuous at the edges, and are also axially shortened off axis parabolic surfaces, that are mounted like they were a flat plate reflector.

Conventional fuels have been used for heating oil shale rock to recover liquids and gases. My new and novel off axis parabolic optical mirror system provides a different source of heat rather than fuel fired retorts. My solar kiln produces high pressure steam for heating and injection into shale oil retorts. My solar kiln heats liquids by passing pipes through a salt bed, over sand, that has an inert gas blanket covering a large pool of molten salt heated by solar radiation which conducts heat to the sand. My solar kiln has an optically transparent window at the top. The U.S. Pat. No. 3,892,433 dated July 1, 1975 by Floyd A. Blake uses heliostat mirrors which are spherically concave solid surfaces of different focal length to direct sunlight onto a heat absorbing medium in order to generate electrical power. By comparison, this instant application does not use spherical mirrors or any approximations thereto as reflectors.

The U.S. Pat. No. 3,905,352 dated Sept. 16, 1975 by Arnold Jahn uses only a multiplicity of separate flat reflectors as mirrors on a sun tracking apparatus to direct solar energy to a heat absorbing area. Thus, a large area parabolic type of collection mirror is not used, as planned in this application.

The U.S. Pat. No. 4,040,411 dated Aug. 9, 1977 by Rudolph Rust must rotate its mirror continuously while in use, to maintain a parabolic figure. However, this instant application is for a large area solid surface parabolic collector that is not required to rotate to maintain its parabolic curvature.

The axially shortened and separate off axis parabolic Fresnel mirrors of this instant application concentrate solar radiation from many sectionalized parabolic reflectors which provide heat that is used for the following list of items.
1. Replace heaters for commercial hot water generators, and to heat private homes, and swimming pool water.
2. Provide a source of high pressure steam for injection into stripper oil wells for crude oil recovery.
3. Generate steam for stationary power plants.
4. Hydrogenate coal in a kiln at atmospheric pressure.
5. Drive gases and shale oil from limestone in a kiln.

This new Fresnel zone solar collector is used for economy in heat operated equipment. It is a fact of fundamental thermodynamics known as Carnot's explanation of heat, that low temperatures are economically useless. The maximum heat intensity of normal unconcentrated solar radiation is only about 300 Btu per hour per square foot of area. This application provides a means of producing high temperatures for industry, and home use by not consuming either coal or fuel oil.

SUMMARY OF THE INVENTION

It is a principal object of this invention to provide a unique optical system combining four sectionalized, and axially shortened, off axis primary replica parabolic mirrors. Instead of traditionally making a circular on axis primary parabola of whatever diameter is desired; four smaller ones are made with the same curvature and focus. A Cassegrainian system results with a central penetration between four off axis parabolas having only a little less light gathering area.

It is a principal object of this invention to fabricate off axis primary replica parabolic mirrors using the principle of the well known Fresnel optical zones. One set of metal master hexagons is spin cast from any molten metal. This one set of metal master hexagons covers only one quadrant of the area covered by a one axis parabola of the desired area. Molten metals are poured into a hexagonal form box and then rotated to cast the one set of metal master hexagons. They are formed into paraboloids of revolution on a centrifuge rotating at constant angular velocity. Then four sets of exactly identical parafin replica molds are cast from each original metal master hexagon. These four parafin replica molds are used to electroplate four metal off axis primary replica parabolas that are identical. All four of these corresponding metal replicas in each optical path are the required Fresnel optical zones of the new off axis primary replica parabolas. A set of four hexagons is exactly the same in curvature and focal distance.

It is a principal object of this invention to produce high quality optical mirrors from liquid materials that go through a change of state in becomming solid during rotation on a centrifuge. Changes of state are not a smooth and uniform transition. For metals the point to point hardening occurs along crystal orientations with regular structure. When casting half inch thick sections of metals and plastics any disturbed portions of the liquid phase remain distorted and propagate to the mirror surface. Thus, it is difficult to spin cast large sections of parabolic mirrors without minor imperfections occuring. Three things must be done to form high quality, large area, spin cast parabolic surfaces.

(1) A wind shield must be used, enclosing a form box.
(2) After casting a rough base parabola inside the form box mold, multiple layers of Cerro alloy and multiple layers of cast aluminum only two millimeters thick are spin cast individually to prevent propagating distortions.
(3) For spin casting epoxy resins, one edge of the hexagonal form box must be alternately raised and lowered cyclically about a half inch during axial rotation, to distribute any heat distortions resulting from internal exothermic chemical reaction during the solidification process.

It is a principal object of this invention to fabricate flat secondary reflectors. The flat optical surface is cast over imbedded high pressure cooling coils so no machining of the final optical surface is required.

It is a principal object of this invention to provide a means for converting the high enthalpy levels obtained from the four off axis primary replica parabolic solar mirrors into useful heat enthalpy.

DESCRIPTION OF THE PREFERRED EMBODIMENT

Figure 1:
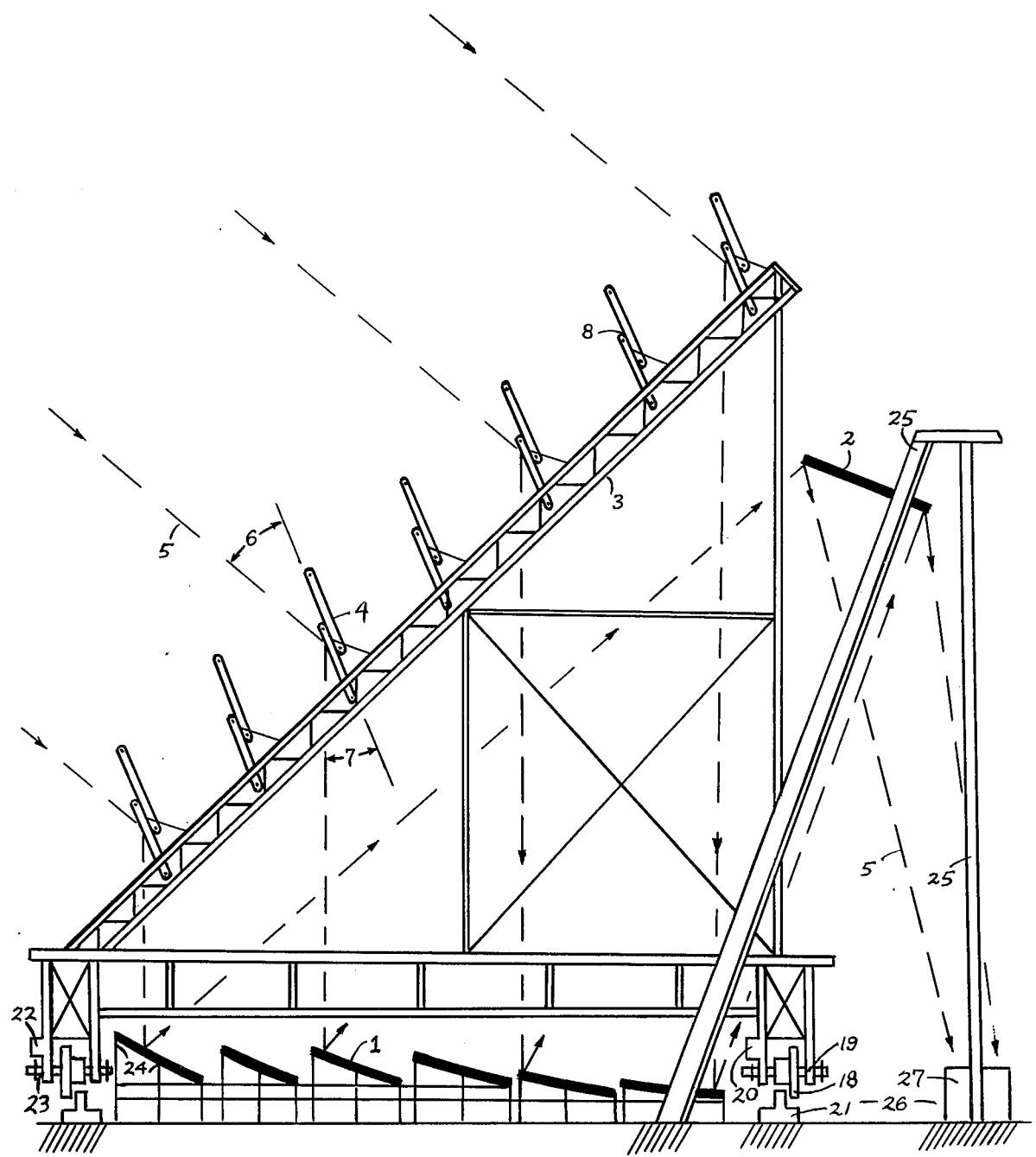
Figure 2:
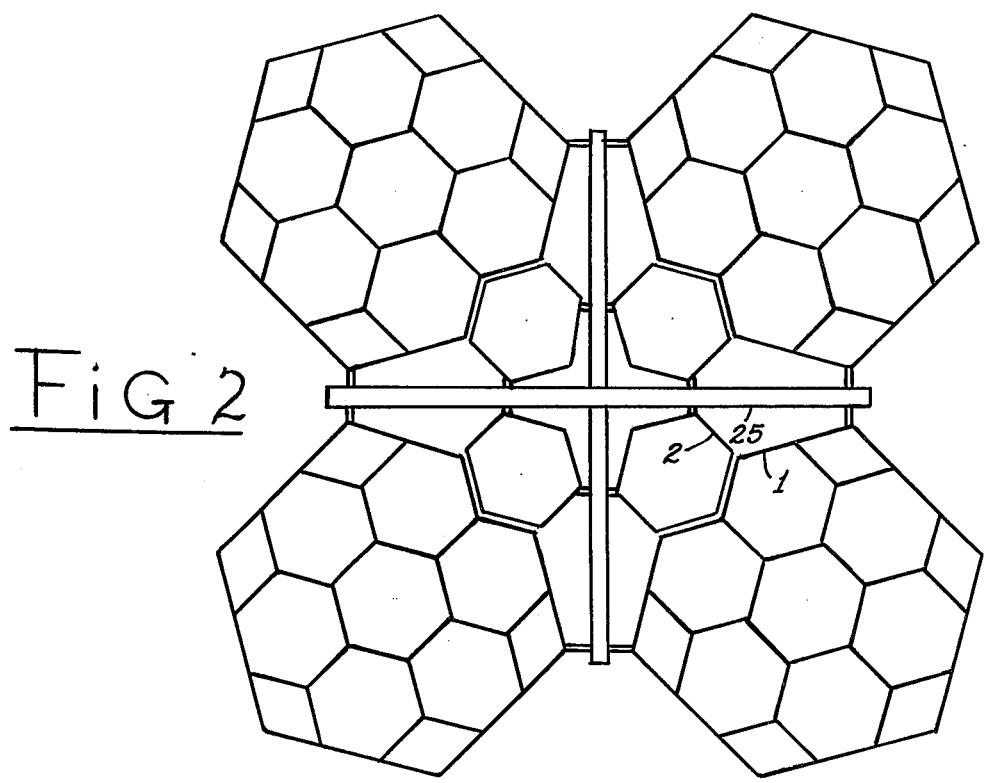
Figure 3:
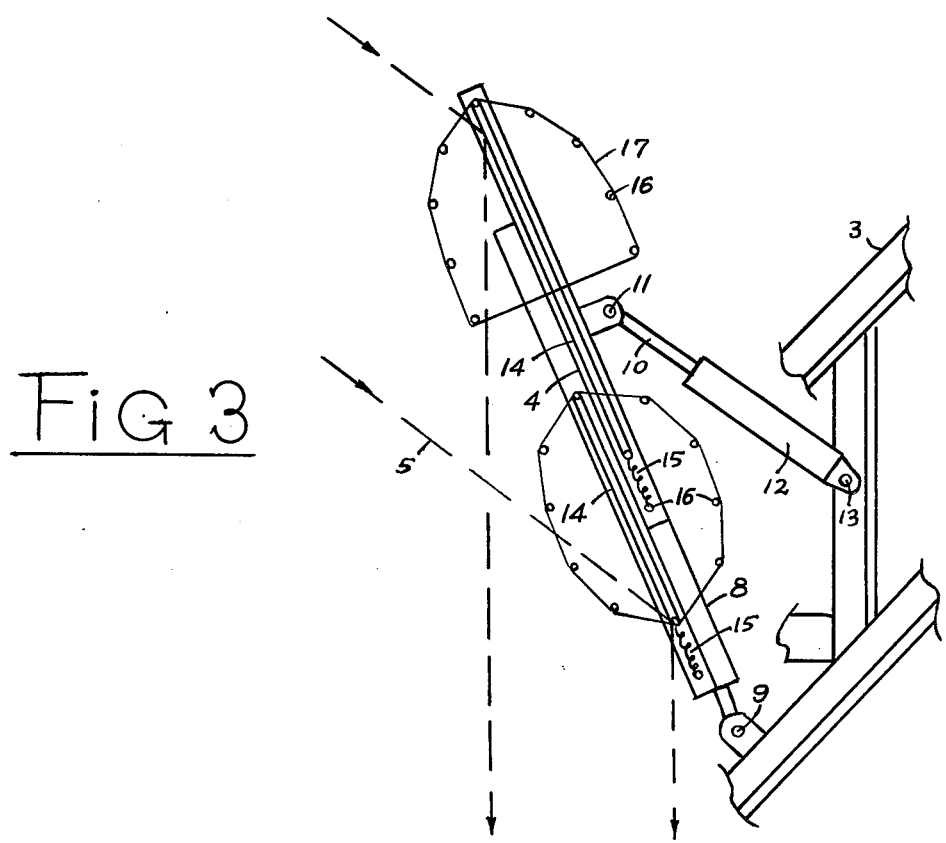

Referring to the drawings, like references indicate like characters and functional usage for each part in the figures. In the preferred embodiment of this invention heat energy is obtained from an off axis primary replica parabola 1 that has a shortened focal length combined optically with a flat secondary reflector 2 supported in a gantry 3. The unique optical system superimposes images from four off axis primary replica parabolas in a short Cassegrainian arrangement.

Said off axis primary replica parabola 1 is fabricated by rotating low melting point alloys of "Cerro" metal, or molten aluminum that harden quickly upon cooling. Molten metals are poured in a hexagonal form box to cast one set of metal master hexagons for said off axis primary replica parabola 1 during constant angular rotation on a centrifuge. This single set of spin cast metal masters is the means by which replicas are made.

It is necessary to fabricate four master parafin replica castings from each hexagon with the same compound curvature as the original spin cast metal master hexagon. This is done by pouring a bit of glycerine over the cool spin cast metal master and then pouring melted parafin into each original hexagonal form box. Thus, four master parafin replica castings are made one after another. Expanded metal is added to each of the four identical master parafin replica castings to give it strength. After each of the parafin molds has set, the original spin cast metal master mold is separated from the four master parafin replica castings. Each of the four identical master parafin replica castings is coated with several layers of silver metal deposited from a fine mist of chemicals as described in the prior art patents listed. Then four identical off axis primary replica parabola 1 are electroplated.

The electroforming is known to the art as solution type plating silver and copper, or bright metallic rhodium, or nickel coatings. Then more copper is plated on back of the mirror before bonding on "honeycomb" cell structure with epoxy to give the part strength. The ½ inch to ¾ inch high cell structure of the honeycomb metal and reinforced plastic is epoxy bonded at room temperature before the electroplated part is separated from its master parafin replica casting. Mild heating and the glycerin parting agent releases the parts.

The fresh concave mirror surface on said off axis primary replica parabola 1 part is then sprayed with a coating of optically clear epoxy to form a thin protective layer over the shiny surface. Honeycomb backed hexagons of the four off axis primary replica parabola 1 are mounted at the base of a two degree of freedom sun tracking mechanism. Groups of four corresponding Fresnel zone hexagons are all alligned optically to superimpose their images at the focus.

As the optical system increases so does the sun tracking system expense. The usual three dimensional parabola is replaced with hexagonal segments, having the same parabolic figure, but shortened axially. Said off axis primary replica parabola 1 is still three dimensional but it is easier to install this new planar mounted device.

By properly designing the parabolic contours, off axis; for said off axis primary replica parabola 1 then said flat secondary reflector 2 can be moved closer to it. This unique Cassegrainian optical system is thus considerably more compact than conventional parabolic optical systems.

Referring to the drawings, said off axis primary replica parabola 1 directs the suns rays from particular hexagon radii to a focal point. Each hexagon has a different three dimensional off axis compound curvature. An average bundle of solar rays leaves a particular hexagon normal to its surface of reflection. Each continuous three dimensional hexagonal contour has a unique shape of said off axis primary replica parabola 1. Hence, the circle of confusion for solar rays at the focal plane of this novel Cassegrainian optical system is determined by only minor diffraction effects from the edges of the hexagons, and minor surface imperfections. Other losses occur due to surface reflectance and the layer of clear epoxy. But, these influences on specular reflection occur on any other type of reflecting surface as well.

Said flat secondary reflector 2 is cooled internally by recirculating solutions inside the flat secondary reflector 2. Also, a cooling brine solution is used made from sodium chloride, and calcium chloride refrigerated down to minus 50 deg F. Said flat secondary reflector 2 is fabricated by pouring either molten copper or nickel metal over high pressure metal tubing placed on the bottom of a hexagonal form box. Then, a high luster reflection coating is placed on its surface by plating.

Reference is made to the off axis primary replica parabola 1 which can be spin cast directly of ¼ inch thick molten aluminum, laid down in thin layers one on top of the other, during rotation. Said gantry 3 is used for slowly rotating the entire Cassegrainian optical system in azimuth. When using said flat secondary reflector 2, the off axis Fresnel zone optical light paths are Newtonian. Said flat secondary reflector 2 can be made more expensive by spin casting it off axis, making the light paths hyperfolic, but this is not necessary.

One, two, three, or four separate optical paths on the apparatus permit up to four optical trains to contribute high temperature heating in steps of required enthalpy. Each of the optical trains has a pair of hexagons; one on said off axis primary replica parabola 1, and the other on said flat secondary reflector 2. All Fresnel zone hexagons are adjusted to superimpose images at the composite focus of the system.

Reference is made to said off axis primary replica parabola 1 combined with telescoping heliostats 4 mounted independently upon said gantry 3. Said telescoping heliostats are large, nominally flat, single axis mirrors mounted on said gantry 3 to form a two axis tracking system used to continuously hold the image of the sun (helio) stationary (stat) onto said off axis primary replica parabola 1.

In operation the very large apparatus requires that gantry 3 rotate to follow the sun in azimuth, and said telescoping heliostats 4 rotate horizontally and change in exposed area. In this new optical system these motions are controlled by electric power which is in turn controlled by an electronic computer programmed to position said gantry 3 and set said telescoping heliostats 4 angle of elevation in accordance with astronomical determinations of the position of the sun. A typical ray 5 of the solar radiation always strikes said telescoping heliostats 4 in such a manner that the angle of incidence 6 always equals the angle 7 between said telescoping heliostats 4 and the vertical. A computer is also programmed to cause said adjustable telescoping heliostats 4 to change area so as to continuously hold the image of the sun at the zenith position. Human senses can replace any of the computer functions used.

In the large optical system any two telescoping heliostats of convenient length and width are held together with positioning slides 8. These restrain their relative motion in any direction except a parallel sliding motion in what can best be described as a telescoping assembly. The lower edges of the lower telescoping heliostats are attached to the structure by pivot 9. Hence, each pair of telescoping heliostats 4 rotate about said pivot 9 to track the sun in elevation. The top portion of the telescoping heliostats are attached to the hydraulic actuator piston rod 10 by the second pivot 11. The hydraulic cylinder 12 is attached to the structure by the third pivot 13. The telescoping heliostats 4 are comprised of a long loop of mylar aluminized plastic sheet 14 stretched by springs 15 between metal rods 16 attached to the telescoping assembly. A plastic cover 17 of transparent tedlar is stretched between metal rods 16 to form a clear protective surface, open at the center, for covering said aluminized plastic sheet 14 against deformation or damage by rain and wind. More expensive materials can be used such as silvered glass, or silver plated aluminum, to provide a front surface specular reflectance of 0.65 to 0.90.

As the hydraulic actuator piston rod 10 shortens or extends said telescoping heliostats 4 slide closer or further apart and change their effective frontal area. This action changes the telescoping heliostats 4, and the hydraulic actuator piston rod 10 must rotate in a manner to pull the assembly away or closer to the vertical. Said hydraulic actuator piston rod 10 changes position by pumping hydraulic fluid from one end of said hydraulic cylinder 12 to the other using commercially available equipment. The number of said telescoping heliostats 4 on this new Cassegrainian optical system depend on the size of the large apparatus and the latitude where it is located.

It is a principal object of this invention to provide a means for combining several optical paths of the apparatus by superimposing concentrated reflections from as many as four said off axis primary replica parabola 1 onto a single focal point area. This is done using the principle of Fresnel optical zones, with exactly the same three dimensional compound curvature, made from corresponding hexagons cast from the same spin cast metal master mold. Refrigerated brine is circulated through said flat secondary reflector 2.

To cause rotation of the off axis optical system one or more flanged wheels 18 on journal bearings 19 are driven in rotary motion by an electric motor 20 that forces said gantry 3 to move in a circular motion around a circular track 21. Feedback of the azimuth position of said flanged wheels 18 is by selsyn transmitter 22 which is rotated by one of the axles 23. The electrical signal from said selsyn transmitter 22 is used to control a computer. Although the preferred embodiment of this invention uses said selsyn transmitter any other means can be used to position the apparatus, including human senses. On the either size specie of the Fresnel optical system each individual mirror is mounted on three adjustment studs 24. A secondary mirror support 25 rotates about said pivot 9 and directs concentrated solar radiation through a mirror penetration 26 to a point behind said off axis primary replica parabola 1 to a solar kiln 27.

It is a known to the art steam generator used for production of high pressure steam from solar radiation. It is made of tubes 28, arranged in a standard boiler assembly.

A sand bin solar kiln 27 heats the said tubes 28 through a sand bed enthalpy exchanger 31 that produces super heated steam 32 in the upper tubes close to a large pool of molten sodium chloride 33, with black nickel oxide added, by passing concentrated radiation through a high velocity nitrogen inert gas window 34. This solar kiln is used with the very large solar collector because the sand bed enthalpy exchanger 31 is too large to be moved. Said tubes 28 are also used to heat high temperature carbonates and other high temperature liquids such as sulfur, liquid sodium, sodium and potassium liquid alloy, and liquid mercury that has been stabilized for corrosion control by addition of 10 ppm titanium inhibitor dissolved in the mercury to slow the rate of attack on iron pipes at 650 C (1200 F) so that low carbon steel could be used. Other high temperature liquids used are Dowtherm, Caloria 43, Mobiltherm 600, and Therminol 66 when heating intermediate liquids, used to heat water at a location remote from said enthalpy exchanger 31. Pairs of inlet and outlet nozzles 35 are used to elutriate vaporized salt particles and nickel oxide from the top of said enthalpy exchanger 31, and to channel inert gases sent through said inert gas window 34 used as an environmental seal.

The third specie of said solar kiln 27 is an atmospheric pressure operated coal gassifier. It is used to hydrogenate powdered coal to produce relatively cheap, low BTU pipeline gas with carbon monoxide, and hydrogen ebullienting from a fluidized bed 36. The inert gas window 34 at the vessel top allows intense concentrated light to impinge on top of said fluidized bed 36. The radiation is so intense it penetrates deep into said enthalpy exchanger 31 portion of said solar kiln 27.

I claim:

1. An apparatus for converting solar radiation into high temperature heat energy wherein the solar radiation is directed downward by means forming reflecting planes onto a stationary array of axially shortened, off axis primary parabolic mirrors arranged such that said downward directed radiation is concentrated upon a flat secondary reflecting means located adjacent to said array and by which the concentrated radiation is directed downward into a stationary radiation to enthalpy exchanger; said reflecting planes being located upon a rotating gantry, said gantry including means to enable said gantry to follow the sun in azimuth and means to pivotally mount said reflecting planes including means to follow the suns radiation in elevation to maintain the angle of incidence of the suns rays vertically upon said stationary array of off axis mirrors.

2. An apparatus as described in claim 1 for concentrating solar radiation into high temperature heat energy wherein said parabolic mirrors consist of stationarily mounted groups of solid surface Fresnel zone mirrors which form said off axis primary parabolic mirror that is shortened axially wherein the suns rays reflected from said primary parabolic mirror surfaces are directed to a flat secondary reflecting means located near said off axis primary parabolic mirror to concentrate said rays upon a stationary radiation to enthalpy exchanger located near means forming the focal point of said primary reflecting means, whereon said off axis primary parabolic mirror is a reflective electroplated material; and wherein said reflecting planes include nearby telescoping heliostat to follow the suns rays in both azimuth and elevation to maintain the suns rays stationary upon said groups of axially shortened Fresnel zone solid surface off axis primary mirrors, and including means to heat water into high pressure steam, and heat molten sodium chloride and molten carbonates, through an inert gas window, and drive gases from limestone rock, and melt sand with intense solar radiation from said stationary off axis primary parabolic mirror surface.

3. An apparatus as described in claim 1 wherein said parabolic solar mirrors consist of optical Fresnel zones which are used to superimpose four sun images into a stationary solar kiln from the off axis primary parabolic mirrors fabricated from a single set of parabolic master hexagons which are spin cast from Cerro alloy, molten aluminum, and epoxy that harden quickly during rotation in a wind shielded form box on a centrifuge, and by pouring melted parafin into each concave parabolic master hexagon, and after cooling each mold, and separating them to get convex master parafin replica castings from each of the spin cast master hexagon molds having the same compound curvature as the original master mold, and coating four identical master parafin replica castings with several layers of silver metal deposited from a fine mist of chemicals and electroplating the convex side of each master parafin replica casting with copper metal, before bonding on a honeycomb cell structure and three adjustment studs using epoxy bonding material to reinforce the very thin copper plated off axis primary mirror and separating these mass produced Fresnel zone parabolic mirrors from their master parafin replica casting and mounting them on the stationary parabolic mirror collection system array.

4. An apparatus as described in claim 1 wherein said stationary off axis primary parabolic mirror is fabricated in contiguous sections that fit together side by side to form a large expanse of mirror that has the outer sections near the rim of the collector set back to a position making a plane with the central mirror sections forming an axially shortened off axis primary replica parabola that is easier to mount on a typical optical Cassegrainian system having Fresnel zone segments of mirror that direct concentrated solar radiation to secondary mirror supports on which a stationary flat secondary reflector is mounted and cooled internally by circulating a solution that is refrigerated to remove excess heat and keep said flat secondary reflector from discoloring its surface and melting.

5. An apparatus as described in claim 3 wherein means is provided to combine several optical ray paths from the sun on a solar collection system by superimposing the concentrated reflections from up to four off axis primary replica parabolas into a stationary solar kiln from separate Fresnel zone hexagons having the same three dimensional compound curvature as corresponding hexagons which are cast from a single spin cast master mold by first casting a rough base parabola inside the hexagonal form box and then spin casting multiple layers of molten aluminum, and in addition spin casting epoxy resin while moving the outer edge of the form box by alternately raising and lowering it.

6. An apparatus as described in claim 3 a parabolic solar collector as described in claim 1 wherein stationary parabolic Fresnel mirrors provide a source of concentrated radiation which produces high pressure steam for stationary power generating plants, and for stripper oil wells, by heating water and generating superheated steam in a sand bin solar kiln beside a solar apparatus that melts salt, and heats sand through a high velocity nitrogen inert gas window by solar radiation in a stationary sand bed enthalpy exchanger having metal pipes pass close to a molten pool of sodium chloride that conducts heat to the sand where imbedded pipes heat high temperature liquid mercury, sulfur, liquid sodium, Calorie 43, Mobiltherm 600, and Therminol 66 in a stationary enthalpy exchanger.

7. An apparatus according to claim 1 wherein the area of the pivoted reflecting planes is varied to suit the angle between said reflecting plane and the vertical, becoming longer as the angle decreases.

8. An apparatus according to claim 1 wherein the radiation to enthalpy exchanger is a stationary heat source used for generating means.

* * * * *